US009183467B2

(12) United States Patent
Wang et al.

(10) Patent No.: US 9,183,467 B2
(45) Date of Patent: Nov. 10, 2015

(54) SKETCH SEGMENTATION

(71) Applicant: Microsoft Technology Licensing, LLC, Redmond, WA (US)

(72) Inventors: Changhu Wang, Beijing (CN); Lei Zhang, Beijing (CN); Zhenbang Sun, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/886,862

(22) Filed: May 3, 2013

(65) Prior Publication Data

US 2014/0328540 A1 Nov. 6, 2014

(51) Int. Cl.
G06K 9/62 (2006.01)
G06K 9/72 (2006.01)
G06K 9/00 (2006.01)

(52) U.S. Cl.
CPC ............ *G06K 9/726* (2013.01); *G06K 9/00476* (2013.01)

(58) Field of Classification Search
None
See application file for complete search history.

(56) References Cited

U.S. PATENT DOCUMENTS

| 5,761,655 | A | 6/1998 | Hoffman |
| 6,044,365 | A | 3/2000 | Cannon et al. |
| 6,182,069 | B1 | 1/2001 | Niblack et al. |
| 6,243,713 | B1 | 6/2001 | Nelson et al. |
| 6,269,358 | B1 | 7/2001 | Hirata |
| 6,463,432 | B1 | 10/2002 | Murakawa |
| 6,564,263 | B1 | 5/2003 | Bergman et al. |
| 6,606,623 | B1 | 8/2003 | Hsieh et al. |
| 6,975,755 | B1 | 12/2005 | Baumberg |
| 7,133,572 | B2 | 11/2006 | Neubauer et al. |
| 7,761,466 | B1 | 7/2010 | Eshghi |
| 8,341,112 | B2 | 12/2012 | Zhang et al. |
| 8,406,532 | B2 * | 3/2013 | Wang et al. .................. 382/209 |
| 8,625,907 | B2 * | 1/2014 | Zitnick et al. ................. 382/225 |
| 8,873,812 | B2 * | 10/2014 | Larlus-Larrondo et al. .. 382/118 |
| 2003/0194135 | A1 | 10/2003 | Wenzel |
| 2003/0200236 | A1 | 10/2003 | Hong |
| 2007/0022329 | A1 | 1/2007 | Adamek et al. |
| 2009/0074302 | A1 * | 3/2009 | Kishi ............................ 382/224 |
| 2012/0072410 | A1 | 3/2012 | Wang et al. |
| 2013/0127869 | A1 * | 5/2013 | Winnemoeller et al. ...... 345/441 |
| 2014/0328544 | A1 | 11/2014 | Wang et al. |

OTHER PUBLICATIONS clipardo.com (Jan. 1, 2010 archive by wayback machine).*
Sivic et al. "Video Google: A Text Retrieval Approach to Object Matching in Videos" Proceedings of the Ninth IEEE International Conference on Computer Vision (ICCV 2003) 2-Volume Set, pp. 1-8.*
Dubuc, et al., "Indexing visual representations through the complexity map", Proc. 5th Int'l Conf. Computer Vision, IEEE, 1995, pp. 142-149.

(Continued)

*Primary Examiner* — Randolph I Chu
(74) *Attorney, Agent, or Firm* — Judy Yee; Micky Minhas

(57) ABSTRACT

Some examples of a sketch-based image segmentation system may segment a hand-drawn sketch based on proximity, intuitive clues and semantic information. For instance, the system may cluster line segments of the sketch if the line segments are within a threshold distance. Further, the system may cluster line segments of the sketch based on a set of intuitive clues. In some implementations, a sketch-based search engine may be utilized to search an image collection to identify images with shape features similar to the sketch and to segment the sketch based on the semantic information associated with the identified images.

19 Claims, 9 Drawing Sheets

(56) References Cited

OTHER PUBLICATIONS

Johnson, et al., "Recognizing Objects by Matching Oriented Points", available at <<http://www.ri.cmu.edu/pub_files/pub2/johnson_andrew_1996_1/johnson_andrew_1996_1.pdf>>, CMU-RI-TR-96-04, 1996, 40 pages.

Office action for U.S. Appl. No. 12/873,007, mailed on Sep. 19, 2013, Wang, et al., "Sketch-Based Image Search", 18 pages.

Olson, et al., "Automatic Target Recognition by Matching Oriented Edge Pixels", IEEE Transactions on Image Processing, vol. 6, No. 1, IEEE, 1997, pp. 103-113.

Shotton, et al., "Multiscale Categorical Object Recognition Using Contour Fragments", IEEE Transactions on Pattern Analysis and Machine Intelligence, vol. 30, No. 7, 2008, IEEE, pp. 1270-1281.

Alter, et al., "Extracting Salient Curves from Images: An Analysis of the Saliency Network", International Journal of Computer Vision at SpringerLink, Kluwer Academic Publishers, vol. 27, Issue 1, 1998, pp. 51-69.

Non-Final Office Action for U.S. Appl. No. 12/873,007, mailed on Jun. 30, 2014, Changhu Wang et al., "Sketch-Based Image Search", 22 pages.

Tamrakar, et al., "No Grouping Left Behind: From Edges to Curve Fragments", In: IEEE 11th Int'l Conf. Computer Vision, 2007. Available at: IEEE.

Ullman et al., "Structural Saliency—the Detection of Globally Salient Structures Using a Locally Connected Network," MIT AI Lab., A.1. Memo No. 1061 (1988). Available at: http://dspace.mit.edu/handle/1721.1/6493#files-area.

Chinese Office Action mailed Jun. 21, 2013 for Chinese patent application No. 201110266398.X, a counterpart foreign application of U.S. Appl. No. 12/873,007, 6 pages.

Lew, "Next-Generation Web Searches for Visual Content", Computer, IEEE, vol. 33, No. 11, Nov. 2000, pp. 46-53.

Office Action for U.S. Appl. No. 13/886,904, mailed Dec. 23, 2014, Wang et al., "Informational Notice to Applicant", 10 pages.

Office action for U.S. Appl. No. 12/873,007, mailed on Dec. 24, 2014, Wang, et al., "Sketch-Based Image Search", 22 pages.

PCT Search Report and Written Opinion mailed Nov. 17, 2014 for PCT Application No. PCT/US14/36471, 12 Pages.

Tieu et al., "Boosting Image Retrieval", Kluwer Academic Publisher, 2004, International Journal of Computer Vision 56 (112), pp. 17-pp. 36.

\* cited by examiner

SKETCH SEGMENTATION

BACKGROUND

With the increased prevalence of electronic imaging devices and the Internet, billions of images have become publically available and searchable online. However, machine segmentation of complex sketches is a difficult task. For example, many sketches do not include an accurate description or tagging, making it difficult for computers to identify distinct objects within an sketch. Moreover, many sketches include multiple objects further increasing the complexity of computer identification. Additionally, while sketch-based segmentation of sketches has been intensively studied, little progress has been made in developing practical large-scale sketch-based segmentation techniques when sketches include multiple objects. Some typical techniques segment sketches based on connectivity, however, these techniques experience difficulty when a sketch includes overlapping or disjointed objects.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide techniques for segmenting a hand drawn sketch including multiple objects, overlapping objects and/or disjointed objects. For instance, a graph-based sketch segmenter may segment a cluttered sketch into multiple objects based on the proximity of line segments. In some cases, the sketch segmenter may utilize intuitive clues, such as similarity in strokes, symmetry of the sketch, direction of strokes, closure and compactness, to segment a sketch into objects. Some examples apply bounding boxes to a part of a sketch and include line segments within the bounding boxes as part of a particular object. As one example, the segmenter uses a semantic-based segmentation technique to identify individual objects within a sketch as each new line segment is added to the object.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Figure 1:
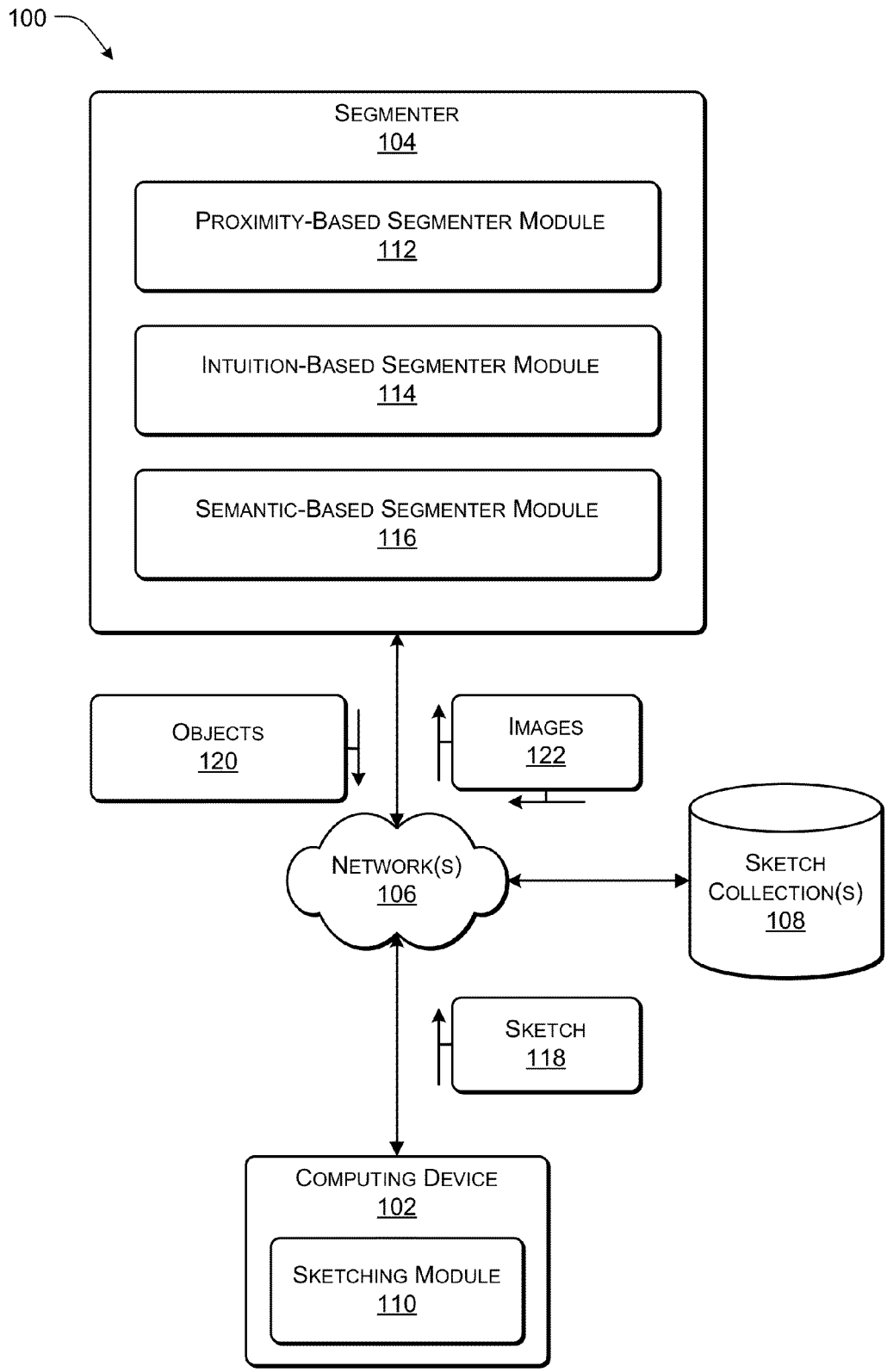
FIG. 1 shows an illustrative computing architecture for segmenting hand-drawn sketches according to some implementations

The disclosed techniques describe implementations of a sketch segmentation system. Various implementations herein provide systems for sketch-based image segmentation that utilize proximity-based segmentation, intuition-based segmentation, semantic-based segmentation and/or a combination of the above-listed segmentation techniques. For example, by utilizing a combination approach, typical problems associated with segmenting a sketch having overlapping objects and/or disjointed objects is substantially mitigated.

In one implementation, a proximity-based segmentation technique is utilized to segment a sketch into objects based on two factors: proximity and similarity. As people tend to group together nearby images with similar appearances, the proximity-based segmentation clusters together line segments or strokes which have the smallest segment distance between them. The process repeats on a line-segment-by-line-segment basis until two line segments cannot be merged (i.e., the distance between them exceeds a threshold). In some examples, the threshold distance may vary depending on the length of the line segment or stroke to be added, as short strokes are most likely part of a larger nearby object regardless of the distance between them. In other examples, the proximity-based segmentation technique merges two line segments if one of the line segments is enclosed (considered "on" an object) by the other, regardless of the distance between the segments. For instance, if the object is a face, the eyes, nose and mouth are enclosed by the line segment representing the face. Therefore, in this implementation, the eyes, nose and mouth are considered part of the face object.

In another implementation, intuition-based segmentation techniques are applied to segment a sketch into objects based on common rules or clues. For example, the intuition-based segmentation may utilize clues such as similarity in strokes, continuity of direction, symmetry, closure of or by an object, compactness of an object and/or use of a bounding box (e.g., does the line segment to be added to an object remain within a bounding box drawn around the object). By analyzing an object based on the common rules or clues as each line segment or stroke is added to the object, many non-connected parts of a sketch may be segmented into a single object.

In another implementation, semantic-based segmentation techniques are utilized to segment a sketch into multiple objects. In the semantic-based segmentation, a collection or database of images is utilized to calculate a score, referred to an entropy value, for a possible object. For example, a clipart database may be utilized since the contours of clipart images may be similar to those of hand-drawn sketches and the clipart images are typically already associated with user assigned text-based categories or labels. A sketch-based search engine is utilized to search the image collection to identify images from the image collection that are similar to proposed objects in the hand-drawn sketch. During the semantic-based segmentation, a line segment is selected and submitted to the sketch-based search engine, which returns a set of identified images as a result. An entropy value, is then calculated for the object based on the images selected by the sketch-based search engine and an object is identified if the entropy value is below a threshold.

In one implementation, the object entropy value is calculated by analyzing the number of different types of objects returned and the number of images of each type returned. For example, if the object is of a giraffe, the sketch-based search engine may return images of giraffes, horses, cows, ostriches and pine trees. Based on the wide range of image types returned, the semantic-based segmenter may determine that the giraffe is not an object within the sketch. However, if a threshold percentage (e.g., 70%, 80%, 90%, etc.) of the images returned are of a giraffe, then the semantic-based segmenter may determine the object to be a giraffe.

In one particular implementation, the semantic-based segmenter recursively adds line segments to the object, submits the object to the sketch-based search engine and calculate entropy values. By observing trends in the change of the entropy value as line segments are added, objects may be identified. For example, if a user draws a bicycle and the semantic-based segmenter starts with a line segment representing the wheel as an object, the sketch-based search engine may return a wide variety of image types, (for instance, balls, wheels, baseballs, rocks, lollipops, etc.) with equal distribution of images between types. The entropy value for the wheel may then be high. In this example, the semantic-based segmenter may add the second wheel to the object and again receive a wide variety of image types with near equal distribution again resulting in a high entropy value. As the line segments representing the frame and the handle bars are added to the object, the object more and more resembles the bicycle, and the image types returned are gradually reduced, while the percentage of images within a single type (i.e., of a bicycle) gradually increase. Once all line segments are included in the object provided to the sketch-based search engine, the entropy value should be at its lowest point and the bicycle identified.

In some examples, the sketch may include a second object. For instance, suppose that the sketch also includes a pine tree. The semantic-based segmenter may submit the object including all the line segments of the bicycle and calculate a low entropy value for the bicycle based on the search results. As there are additional line segments in the sketch (the line segments representing the pine tree), the semantic-based segmenter may continue to add the line segments to an object and calculate entropy values.

The newly added line segments are associated with the pine tree object rather than the object representing the bicycle. At this point, the other types of images returned by the sketch-based search engine may increase and the percentage of images representing the bicycle may decrease, resulting in an increased entropy value. Thus, by detecting the increase in entropy value caused by adding the line segment associated with the pine tree to the bicycle object, the semantic-based segmenter may identify the line segment associated with the tree as part of a second object (i.e., the pine tree) and remove the line segment from the bicycle object. In this way, multiple overlapping and/or disjointed objects may be accurately identified within a single sketch.

In some implementations, the system analyzes a hand-drawn sketch by utilizing a combination of segmenting techniques. For example, for a given object of an image, the system selects a line segment and applies the proximity-based segmenter. If the proximity-based segmenter merges the line segments into the object, then the system selects another line segment and applies the proximity-based segmenter again. However, if the proximity-based segmenter does not merge the line segments, the intuition-based segmenter analyzes the line segmenter and the current object using the intuitive clues and common rules discussed above. Further, if the intuition-based segmenter merges the line segment into the object, another line segment is selected and the proximity-based segmenter is applied again. However, if the intuition-based segmenter also fails to merge the line segment into the object the semantic-based segmenter calculates the entropy value for the object and determines if the object is complete. For example, the semantic-based segmenter may determine that an object is complete if the entropy value is below a predetermined entropy value threshold or if the entropy value of the object, without adding any additional line segments, is lower than the entropy value of the object after adding any of the additional line segments. If the object is not complete (i.e., the entropy value of the object with the additional line segment is lower) the semantic-based segmenter merges the additional line segment into the object and the system determines if any more line segments may be added by the proximity-based segmenter. In some implementations, this process continues to repeat until the semantic-based segmenter determines that the object is complete.

Illustrative Environment

FIG. 1 shows an illustrative computing architecture 100 for recognizing hand-drawn sketches according to some implementations. The architecture 100 includes one or more computing devices 102 in communication with a segmenter 104, such as via one or more networks 106. The architecture 100 may include one or more image collections 108 accessible to the segmenter 104 either locally on the same computing device, or over the network 106. Further, while the example of FIG. 1 shows the sketching module 110 communicating with the segmenter 104 over the network 106, in other examples, the sketching module 110 may be executed on the same computing device as the segmenter 104.

The sketching module 110 is configured to receive user inputs and to interpret the user inputs as hand-drawn sketches. For example, the sketching module 110 may convert user inputs at a touch screen, a touch pad, a drawing pad, as part of an interactive drawing game, from a mouse, a track ball, or any other suitable input device, into a hand-drawn sketch and provide the sketch to the segmenter 104 for identification.

The segmenter 104 may be hosted on a server computing device that also hosts any number of applications and/or services. In this example, the segmenter 104 includes a proximity-based segmenter module 112, an intuition-based segmenter module 114 and a semantic-based segmenter module 116. The segmenter 104 may be implemented on one or more server computing devices arranged in any number of ways, such as server farms, stacks, and the like that are commonly used in data centers and do not necessarily need to be co-located.

The proximity-based segmenter module 112 is configured to segment a hand-drawn sketch into one or more objects based on proximity and similarity of line segments, for example, by merging short line segments with nearby larger line segments, even if there is no connectivity between the line segments. The intuition-based segmenter module 114 is configured to segment a hand-drawn sketch into one or more objects based on a set of visual clues or common rules. For example, by merging line segments formed with similar strokes. The semantic-based segmenter module 116 is configured to segment a hand-drawn sketch into one or more objects based on entropy values calculated for the object using the results of a sketch-based image search, for example, by merging line segments into an object and calculating entropy values until one of the entropy values falls below a predetermined threshold. In some examples, one or more of the modules 112, 114 and/or 116 are utilized to segment a hand-drawn sketch into multiple objects.

The image collection(s) 108 may be collections of cataloged images publically available on the web, which may be returned as results from a web crawler. In some examples, the image collection 108 may include one or more clipart collections, retrieved by a web crawler, and that include labels, tags or other identifiers that identify each image, such as a category, subject or topic of each image. Clipart collections are particularly suited for sketch-based image searching, as the contours of the clipart images have a similar style to hand-drawn sketches, the images are often of a single object, and the images are typically tagged by the person who created the image.

Generally, a user draws a sketch 118 using the sketching module 110 of the computing device 102, for example, by tracing inputs on a touch screen. The computing device 102 provides one or more strokes of the hand-drawn sketch 118 to the segmenter 104. For instance, the sketch 118 may be provided one stroke at a time, as each stroke is entered. Alternatively, a completed sketch 118 may be provided. The segmenter 104 applies one or more of the proximity-based segmenter module 112, the intuition-based segmenter module 114 and the semantic-based segmenter module 116 to segment the sketch 118 into one or more identified objects 120, for example, as part of an image tagging system for use with one or more social networking websites. In some implementations, the segmenter 104 utilizes only one of the segmenter modules 112, 114 or 116, while, in other implementations, the segmenter 104 may apply the segmenter modules 112, 114 and 116 in combination based on one or more predefined schemas.

In one implementation, the sketch 118 is segmented based on a line segment by line segment approach. For instance, the segmenter 104 may randomly select a line segment as a first line of the object 120. The segmenter 104 may then apply the proximity-based segmenter module 112, the intuition-based segmenter module 114 and/or the semantic-based segmenter module 116 to merge line segments with the selected line segment to form the object 120.

Generally, the proximity-based segmenter module 112 merges line segments with the object 120 based on proximity and similarity. For example, the proximity-based segmenter module 112 clusters together line segments which have the smallest distance from a line segment already incorporated into the object 120. In another example, the proximity-based segmenter module 112 clusters together line segments whose distance from any line segment of the object 120 is within a threshold distance. In some particular implementations, the threshold distance may vary depending on the length of the line segment or stroke to be added to the object 120. For instance, short line segments that are further from the object 102 than longer line segments may be added ahead of the longer segments, as short strokes are more likely part of a larger nearby object regardless of the distance. In another implementation, the proximity-based segmenter module 112 merges a line segment into the object 120 if the line segment is enclosed by the object 120 regardless of the distance between the line segment and the object 120.

In another implementation, the intuition-based segmenter module 114 merges line segments into the object 120 by analyzing the line segments according to context based clues and common rules. For example, the intuition-based segmenter module 114 may analyze similarity in strokes of the line segments, continuity of direction of the line segments, symmetry in the object 120 if a line segment is merged, closure of or by the object 120 if a line segment is merged, compactness of the object 120 before and after a line segment is merged into the object 120 and/or if the line segment falls within a bounding box of the object 120.

In another implementation, the semantic-based segmenter module 116 utilizes the image collection 108 to segment the sketch 118 into the objects 120 by calculating an entropy value for combinations of line segments that may be objects. A sketch-based search engine is utilized to search the image collection 108 to identify images similar to proposed objects in the hand-drawn sketch 118. In this implementation, one or more line segments are selected and submitted to the sketch-based search engine, which returns a set of identified images 122. An entropy value is calculated based on the images 122 returned from the sketch-based search engine and an object is identified if the entropy value is below a threshold. In one implementation, the entropy value is calculated by analyzing the number of different types of the images 122 returned and the number of the images 122 of each type returned.

While the hand drawn sketch recognition system has been described above with respect to a client-server configuration, in some implementations the image recognition may be performed wholly on the computing device 102 or with various functionality split between the servers hosting the segmenter 104 and the computing device 102. For example in one particular implementation, the segmenter 104 may be incorporated into the sketching module 110 on the computing device 102, while the image collection 108 is stored remote from the computing device 102, or stored locally, as described below with respect to FIG. 2.

Figure 2:
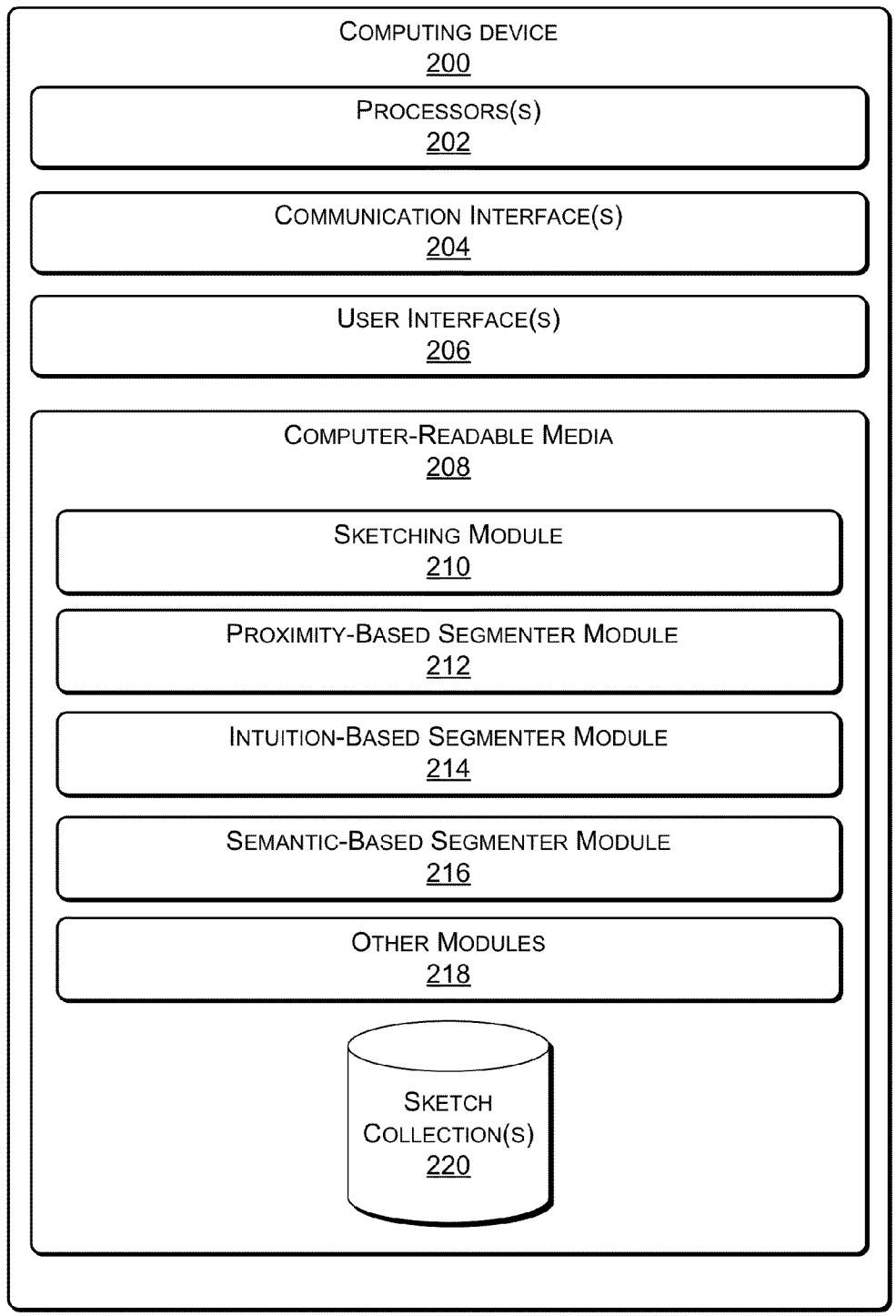
FIG. 2 is a block diagram of an example framework of a computing device according to some implementations.

FIG. 2 is a block diagram of an example framework of a computing device 200 according to some implementations. In the illustrated example, the computing device 200 includes, or accesses, components such as one or more processors 202, one or more communication interfaces 204 and one or more user interfaces 206, in addition to various other components. In some examples, the processors 202 may be one or more control logic circuits, central processing units, processing cores or general purpose processors. The processors 202 are configured to access one or more computer-readable media 208 to perform the function of the computing device 200.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible medium that can be used to store information for access by a computing device.

In contrast, communication media may embody computer-readable instructions, data structures, program modules, or other data in a modulated data signal, such as a carrier wave. As defined herein, computer storage media does not include communication media.

Several modules such as instruction, data stores, and so forth may be stored within the computer-readable media 208 and configured to execute on the processors 202. A proximity-based segmenter module 212, an intuition-based segmenter module 214 and a semantic-based segmenter module 216 are provided to segment a hand-drawn sketch into one or more objects. Various other modules 218 may also be stored on computer-readable storage media 208, such as an operating module.

In some implementations, the computer-readable media 208 may also store one or more image collections 220. The image collections 220 may be one or more collections of categorized sketches or images, such as clipart, photographs, or the like. The image collection 220 is searched by one or more sketch-based search engines stored in the computer-readable storage media 208, for example, as part of the semantic-based segmenter module 216. In the illustrated example, the image collection 220 is stored on computer-readable storage media 208, however, in other examples, the image collection 220 may be stored on one or more remote servers and accessed, e.g., via the Internet.

The communication interfaces 204 facilitate communication between one or more networks (such as network 106 of FIG. 1) and/or one or more cloud services. The communication interfaces 204 may support both wired and wireless connection to various networks, such as cellular networks, radio, WiFi networks, short-range or near-field networks (e.g., Bluetooth®), infrared signals, local area networks, wide area networks, the Internet, and so forth.

The user interfaces 206 are configured to receive user inputs, such as a hand-drawn sketch, and to provide outputs to the user, for example such as the objects segmented from a sketch. For example, the user interfaces 206 may include one or more input components, such as keyboards, keypads, joysticks, a mouse, displays, or control buttons. In one particular implementation, the user interfaces 206 may include one or more touch screens to enable a user to sketch an image and or edit an image by tracing strokes.

In one example, a user traces strokes on the user interface 206 using the sketching module 210. The strokes are segmented into objects by the computing device 200 using the proximity-based segmenter module 212, the intuition-based segmenter module 214 and the semantic-based segmenter module 216. For example, the user may be editing an image using the sketching module 210 by adding a line segment represented by the strokes traced on the user interface 206. The computing device 200 may determine which object of multiple objects in the image that the stroke belongs to by segmenting the image.

In various implementations, the computing device 200 utilizes one or more of the proximity-based segmenter module 212, the intuition-based segmenter module 214 and the semantic-based segmenter module 216 to identify an object to which the stroke belongs. In some implementations, the proximity-based segmenter module 212, the intuition-based segmenter module 214 and the semantic-based segmenter module 216 are utilized in combination to identify an object to which the stroke belongs.

For example, the proximity-based segmenter module 212 may take the image including the stroke and segment the image into objects based on two factors: proximity and similarity. The proximity-based segmenter module 212 clusters together two line segments which have the smallest segment distance between them. The process repeats on a line segment by line segment basis until two line segments cannot be merged (i.e. the distance between them exceeds a threshold). In some particular implementations, the threshold distance may vary depending on the length of the line segment or stroke to be added, as short strokes are most likely part of a larger nearby object regardless of the distance between them.

In another particular implementation, the proximity-based segmenter module 212 merges two line segments if one of the line segments is enclosed (considered "on" an object) by the other regardless of the distance between the segments.

In another example, intuition-based segmenter module 214 applies common rules or clues to segment the image. For example, the intuition-based segmenter module 214 may analyze the stroke and the image by determining if the stroke continues in the direction of line segments of the object, adding the stroke to the object provides symmetry, adding the stroke to the object provides closure of or if the stroke is enclosed by the object, the stroke is within a threshold distance of the object, the stroke has similar length as to the line segments in the object and/or if the stroke falls within a bounding box generated around the object.

In another example, the semantic-based segmenter module 216 adds the stroke to each object of the image and calculates an entropy value for each of the objects. To calculate the entropy value for each of the objects, a sketch-based search engine is utilized to search the image collection 220 to identify images similar to the proposed objects and return a set of identified images as a result. The entropy value for each object with the stroke added is calculated based on the images returned by the sketch-based search engine. For example, the semantic-based segmenter module 216 may analyze the number of different types of object returned and/or the number of types of images returned. The object with the lowest entropy after addition of the stroke may be selected as the object to which the stroke belongs.

Figure 3:
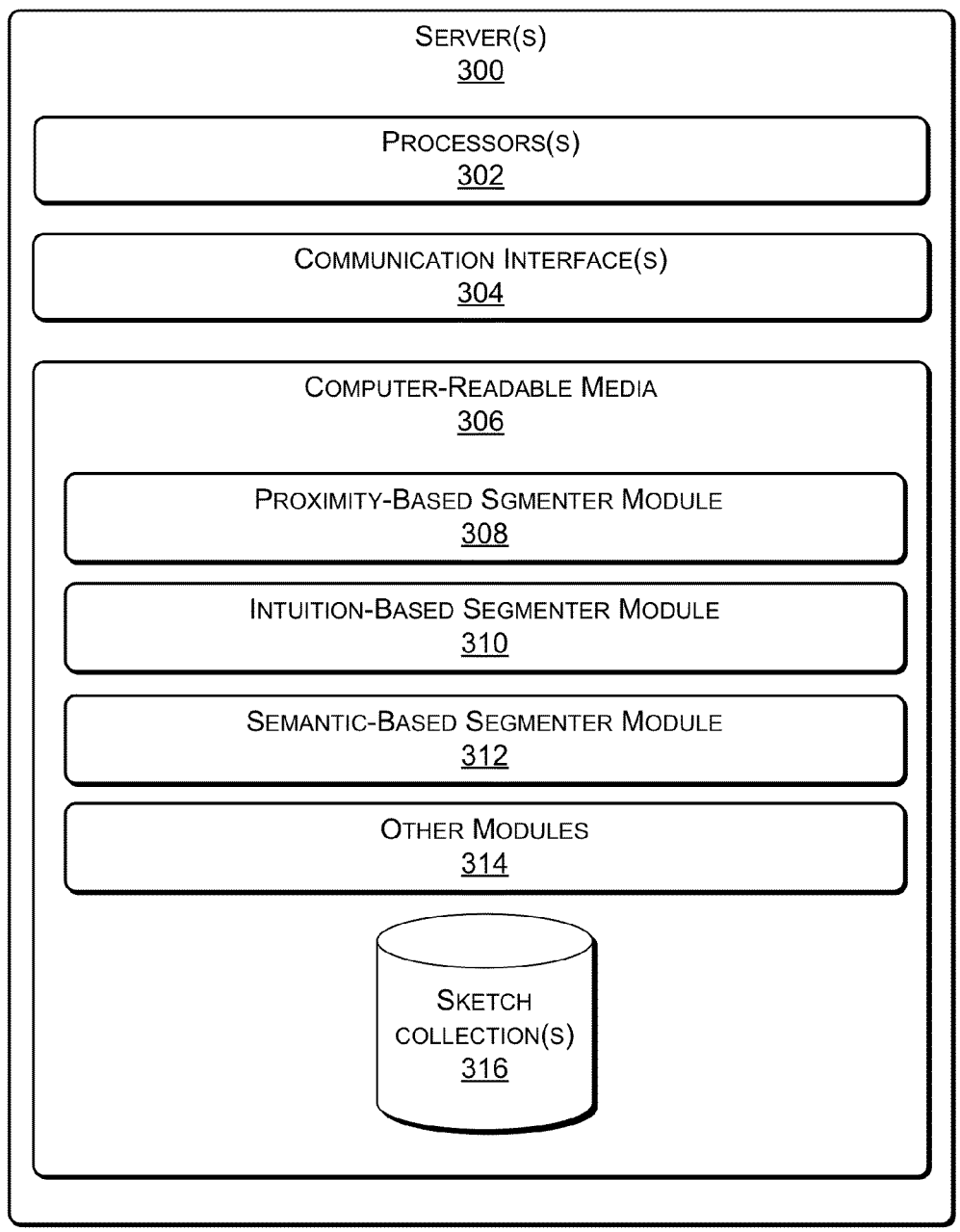
FIG. 3 is a block diagram of an example framework of a server according to some implementations.

FIG. 3 is a block diagram of an example framework of a computing device such as a server 300 according to some implementations. In the illustrated implementation, the server 300 includes components such as one or more processors 302, one or more communication interfaces 304 and computer-readable media 306 to perform the function of the server 300. The server 300 may include any number of servers arranged in any number of ways, such as server farms, stacks, and the like that are commonly used in data centers.

Several modules such as instruction, data stores, and so forth may be stored within the computer-readable media 306 and configured to execute on the processors 302. A proximity-based segmenter module 308, an intuition-based segmenter module 310 and a semantic-based segmenter module 312 are provided to segment a hand-drawn sketch into one or more objects. Various other modules 314 may also be stored on computer-readable storage media 306, such as an operating module.

In some implementations, the computer-readable media 306 may also store one or more image collections 316. The image collection 316 may be one or more collections of categorized hand-drawn sketches or images, such as clipart. The image collection 316 may be searched by one or more sketch-based search engines stored in the computer-readable storage media 306, for example, as part of the semantic-based segmenter module 312.

The communication interfaces 304 facilitate communication with one or more computing devices (such as computing device 200 of FIG. 2 or computing device 102 of FIG. 1) via one or more networks (such as network 106 of FIG. 1). The communication interfaces 304 may support both wired and wireless connection to various networks, such as cellular networks, radio, WiFi networks, short-range or near-field networks (e.g., Bluetooth®), infrared signals, local area networks, wide area networks, the Internet, and so forth.

Generally, the server 300 receives a hand-drawn sketch via the communication interface 304, for example, from a computing device (such as computing device 200 of FIG. 2). In various implementations, the server 300 utilizes one or more of the proximity-based segmenter module 308, the intuition-based segmenter module 310 and/or the semantic-based segmenter module 312 to identify objects within a sketch. In some implementations, the proximity-based segmenter module 308, the intuition-based segmenter module 310 and the semantic-based segmenter module 312 are utilized in combination to segment a sketch.

For example, in one implementation, the proximity-based segmenter module 308 is utilized to segment a sketch into objects by clustering together line segments or strokes of the sketch with the smallest distance in-between. The process repeats line segment by line segment until line segments can no longer be merged into the object. For example, a threshold distance may be set and if the distances of all remaining line segments to the object exceeds the threshold, then the object is complete and the proximity-based segmenter module 308 beings the process over starting with an un-clustered line segment. In some particular examples, the threshold distance may vary based on the length of the line segment to be added. For instance, short strokes are most likely part of a larger nearby object regardless of the distance between them so the threshold distance may be increased when analyzing a short stroke and decreased when analyzing a longer stroke.

In one particular implementation of the proximity-based segmenter module 308, the proximity-based segmenter module 308 may merge line segments $S_1$ and $S_2$ based on an minimum internal distance M Int($S_1$, $S_2$), which may be expressed as follows:

$$M\,\mathrm{Int}(S_1,S_2) = \min(\mathrm{Int}(S_1), \mathrm{Int}(S_2)) + \max(\tau(S_1), \tau(S_2)) + \lambda \mathrm{Corr}(S_1, S_2) \quad (1)$$

where $\tau(S_1)$ represents a tolerance, which may vary based on length of the line segments $S_1$ and $\lambda \mathrm{Corr}(S_1, S_2)$ represents an enclosure correlation between the line segments $S_1$ and $S_2$. In some examples, $\tau(S_i)$ may be expressed as $\tau(S_i) = k/|s_i|$ where $|s_i|$ denotes the length of line segment $S_i$ and k represents a tunable parameter. Thus, the $\max(\tau(S_1), \tau(S_2))$ increases as the length of line segments $S_1$ or $S_2$ decrease and segments $S_1$ and $S_2$ are merged if the distance is large but the segment length is small, as the M Int($S_1$, $S_2$) remains above the threshold. In some examples, the enclosure correlation, $\lambda \mathrm{Corr}(S_1, S_2)$, may be expressed as:

$$\frac{|c_{S_1} \cap c_{S_2}|}{\min\{|c_{S_1}|, |c_{S_2}|\}} \quad (2)$$

where $c_{S_i}$ is the convex hull value of the segment $S_i$ and $|c_{S_i}|$ is the area of the convex hull. The union of the convex hulls is taken to calculate the overlap region between $C_1$ and $C_2$. The enclosure correlation is then added to the M Int($S_1$, $S_2$), such that if one segment encloses the other than M Int($S_1$, $S_2$) remains greater than the threshold and the line segments are clustered even if the distance between the two line segments is large.

In another implementation, intuition-based segmenter module 310 segment the sketch into objects based on common rules or clues. For example, the intuition-based segmenter module 310 may utilize clues such as similarity in strokes, continuity of direction, symmetry, closure of or by an object, compactness of an object and/or use of a bounding box (e.g. does the line segment to be added to an object remain within a bounding box drawn around the object) to group line segments into an object.

In another implementation, semantic-based segmenter module 312 segments the sketch into multiple objects. The semantic-based segmenter module 312 accesses the image collection 316 using a sketch-based search engine. The sketch-based search engine returns from the image collection 316 images similar to proposed object. Based on the images returned, an entropy value is calculated. For example, the entropy value may be calculated by analyzing the number of images of different types of objects returned and the number of images of each type of object returned. In one particular implementation, the semantic-based segmenter module 312 recursively adds line segments to the object, submits the object to the sketch-based search engine and calculates entropy values. By observing trends in the change of the entropy values as line segments are added to the object, objects may be identified.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Illustrative Processes

Figure 4:
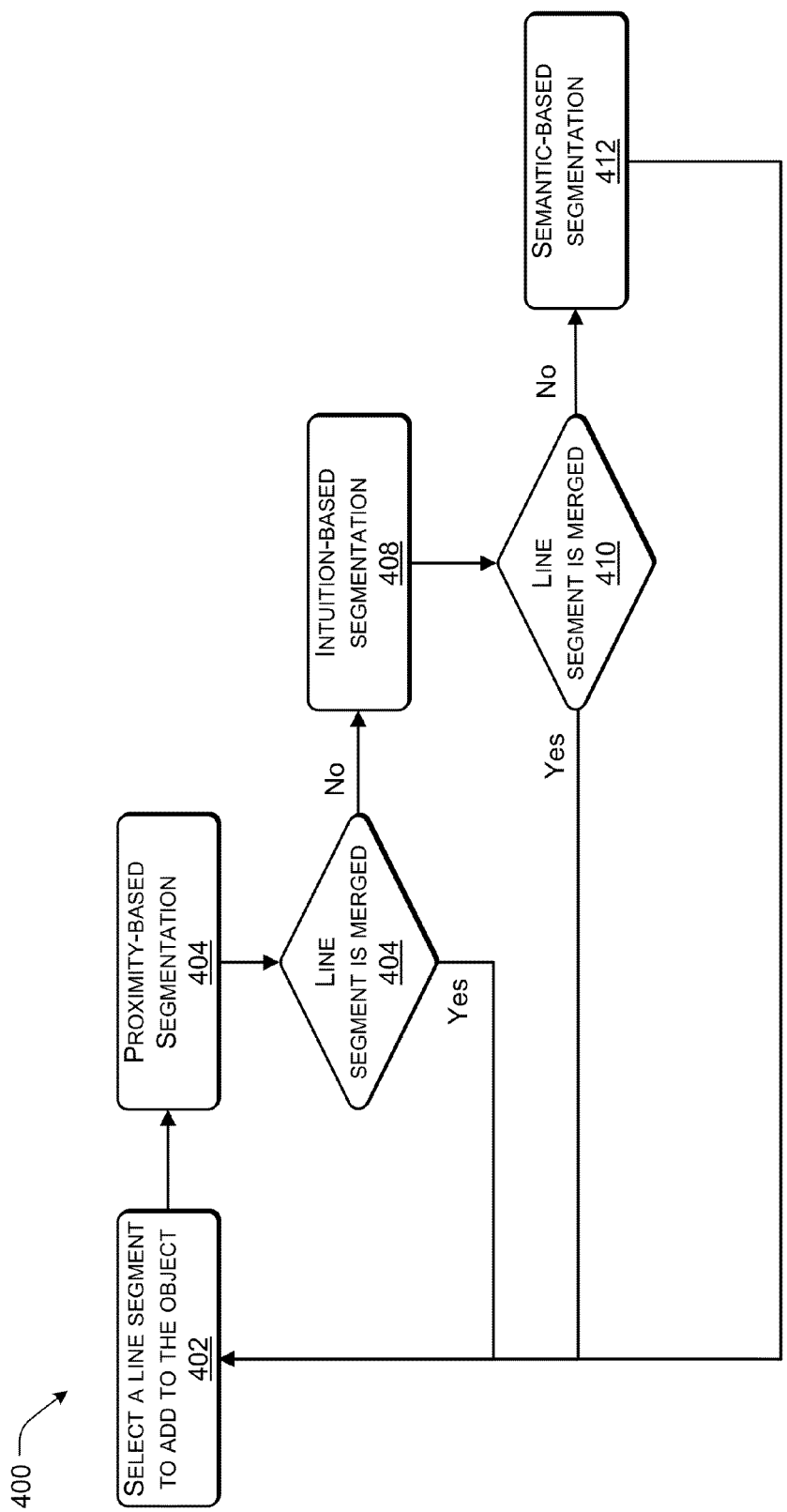
FIG. 4 is an example flow diagram showing an illustrative process for segmenting hand-drawn sketches according to some implementations.
Figure 5:
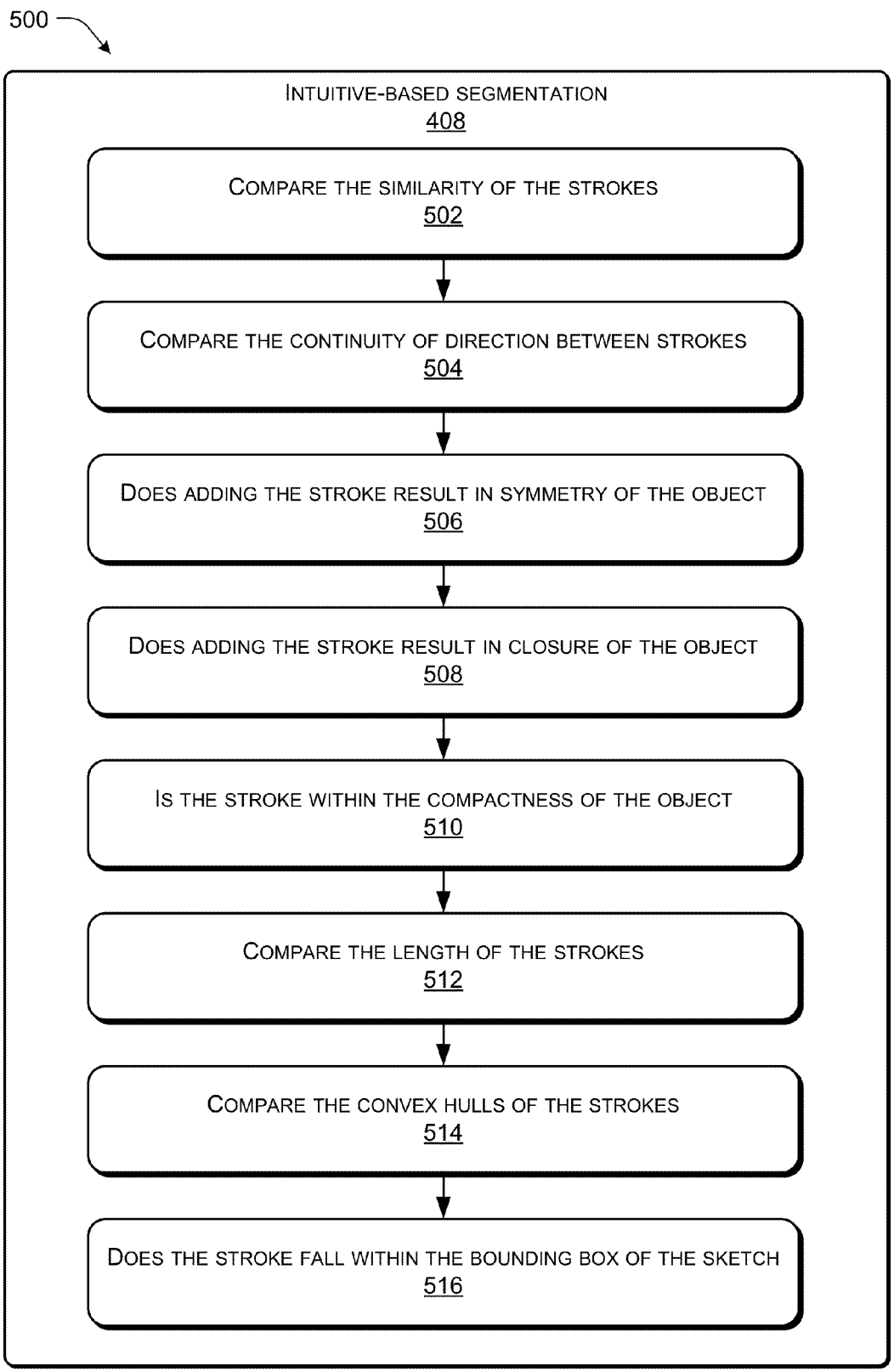
FIG. 5 is an example flow diagram showing an illustrative process for intuition-based sketch segmentation according to some implementations.
Figure 6:
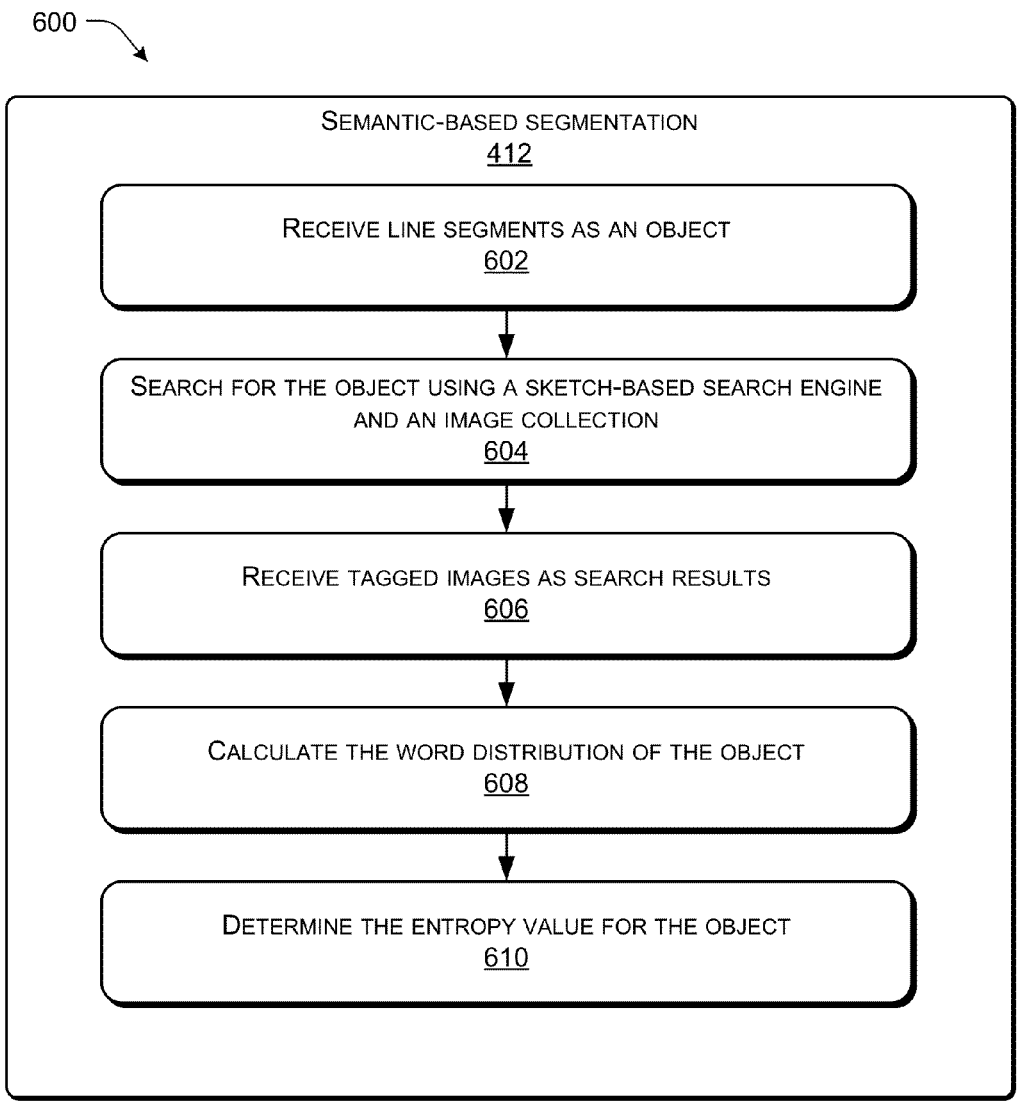
FIG. 6 is an example flow diagram showing an illustrative process for semantic-based sketch segmentation according to some implementations.

FIGS. 4, 5 and 6 are flow diagrams illustrating example processes for segmenting hand-drawn sketches. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 4 is an example flow diagram showing an illustrative process 400 for segmenting hand-drawn sketches according to some implementations. The process 400 segments hand-drawn sketches on a line segment by line segment basis. The process 400 beings with a segmenter selecting a line segment as an object. The segmenter then adds strokes to the object one by one until no additional strokes or line segments may be added. At 402, the segmenter selects a new line for adding to the object. The line segment may be selected based on various criteria, for example, randomly, in one or more spatial orders, distance from the object being segmented, etc.

At 404, the segmenter performs proximity-based segmentation. For example, the proximity-based segmentation clusters the line segment into the object if the distance between the line segment and the object is within a threshold distance. In some implementations, the threshold distance may vary depending on the length of the line segment. For example, the threshold distance may be based on the length of the line segment, such that as the length of the line segment decreases the threshold distance increases. In another example, during the proximity-based segmentation, the segmenter merges the line segment into the object if the line segment is enclosed (considered "on" the object) by the object.

At 406, the segmenter considers if the line segment was merged into the object during the proximity-based segmentation. If so the process 400 returns to 402 and another line segment is selected, as the proximity-based segmentation is the least resource intensive technique. However, if the proximity-based segmentation does not merge the line segment into the object then the process 400 proceeds to 408.

At 408, the segmenter performs intuition-based segmentation on the line segment and the object. The intuition-based segmentation analyzes the line segment and the object using clues or common rules to determine if the line segment is part of the object. For example, intuition-based segmentation may analyze similarity in strokes between the line segment and the object, continuity of direction between the line segment and the line segments of the object, symmetry of the object if the line segment is added to the object, closure of or by the object (i.e. the object would be closed if the line segment is added or the line segment lies within the object), compactness of the object and/or use of a bounding box.

At 410, the segmenter considers if the line segment was merged into the object during the intuition-based segmentation. If so the process 400 returns to 402, another line segment is selected, and the proximity-based segmentation is applied again. However, if the intuition-based segmentation does not merge the line segment into the object then the process 400 proceeds to 412.

At 412, the segmenter performs semantic-based segmentation on the line segment and the object. During the semantic-based segmentation, the object including the line segment is submitted as a query to a sketch-based search engine. The sketch-based search engine returns categorized images as a result and the segmenter calculates the entropy value based on the search results. The process 400 then returns to 402 and repeats until all line segments have been analyzed.

FIG. 5 is an example flow diagram showing an illustrative process 500 for intuition-based sketch segmentation according to some implementations. For example, during the process 500 the segmenter analyzes whether a stroke U belongs as part of an object with line segments S. At 502, the segmenter compares the similarity between line segments S of the object and stroke U by calculating a similarity feature $f_{sim}$ and if the similarity feature is within a threshold of similarity, the stroke U belongs to the object 120. For example, the stroke U may be divided into two sub-strokes designated by $u_1$ and $u_2$. The orientation $\theta_1$ and $\theta_2$ of the sub-strokes $u_1$ and $u_2$ are calculated by fitting a line to the sub-strokes. A first feature $\alpha_1$ of the stroke U is then obtained by subtracting $\theta_2$ from $\theta_1$. Additional features $\alpha_i$ to $\alpha_j$ are obtained for the stroke U by dividing into groups of, e.g., 4, 8, 16, . . . sub-strokes. In this manner, a feature vector $\alpha_u$ is obtained for the stroke U. Once the feature vector is obtained the similarity between the line segments may be determined, for example, using the following equation:

$$f_{sim} = \min_{\bar{u}\in S}\|\alpha_{\bar{u}}-\alpha_s\| \quad (3)$$

If $f_{sim}$ is within a threshold then the stroke U is merged with the object. In this way, unconnected strokes may be merged into the object if the newly selected stroke is similar to the line segments already incorporated into the object.

At 504, the segmenter compares the continuity of direction between the line segments S of the object and the stroke U and if the continuity is within a threshold then the stroke U belongs to the object. For instance, in some implementations, a point p is used to denote the first point of the stroke U. Further, let ṕ denote the closest point to p in the line segments S. The orientation of the stroke $\theta_p$ and the orientation of the line segment $\theta_{ṕ}$ at points p and ṕ are then determined. The continuity of direction is calculated by subtracting $\theta_{ṕ}$ from $\theta_p$. If the continuity of direction is within a threshold, then the stroke U belongs to the object and may be merged.

At 506, the segmenter determines if adding the stroke U result in symmetry of the object. For example, the segmenter analyzes the symmetry of the object with the stroke U incorporated. For instance, in some implementations, the stroke U is merged with the object denoted by $O_{new}$ and a centroid of $O_{new}$ is calculated. $O_{new}$ is flipped vertically based on the centroid to generate $O'_{new}$. The horizontal symmetry is calculated by taking the Chamfer distance between $O_{new}$ and $O'_{new}$. $O_{new}$ is also flipped vertically to generate $O''_{new}$ and centrosymmetrically to generate $O'''_{new}$. The vertical and centrosymmetrically symmetry is calculated by taking the Chamfer distance between $O_{new}$ and $O''_{new}$ and $O_{new}$ and $O'''_{new}$, respectively. If the smallest of the Chamfer distances is within a threshold then the stroke U is merged with the object.

At 508, the segmenter determines if adding the stroke U results in closure of the object. For example, the segmenter may determine if the stroke U is within the object and, if it is, merge the stroke U with the object. For instance, the enclosure correlation, Corr(S, U), may be expressed as:

$$\frac{|c_S \cap c_U|}{\min\{|c_S|, |c_U|\}} \quad (4)$$

where $c_S$ is the convex hull of the object and $|c_S|$ is the area of the convex hull. The union of the convex hulls is taken to calculate the overlap region between $C_S$ and $C_U$. The enclosure correlation is then compared and if the stroke U is within the closure of the object, it is merged with the object.

At 510, the segmenter determines if the stroke U is within a compactness threshold of the object. For example, the compactness $f_{compact}$ of the object and the stroke U may be determined based on the distance Dist(S, U) between the object and the stroke U and internal difference Int(S) of the line segments S. In one example the compactness may be expressed as follows:

$$f_{compact} = \frac{Dist(S, U)}{Int(S)} \quad (5)$$

The compactness $f_{compact}$ is compared to the compactness threshold to determine if the stroke U should be merged with the object.

At 512, the segmenter compares the length of the stroke U and the line segments of the object. For example, a feature length $f_{length}$ may be calculated by dividing the length of U by the length of the line segments S. Again, if $f_{length}$ is less than a threshold change in length than the stroke U may be added to the object, as the lengths of the line segments S and the stroke U are similar.

At 514, the segmenter compares the convex hulls of the stroke U and the object. For example, the overlap of the convex hulls may be calculated by dividing the area of the convex hull of the stroke U by the convex hull of the object. If the areas are overlapping or contained one within the other, then the stroke U is considered part of the object.

At 516, the segmenter determines if the stroke U is within a bounding box B of the object. For example, the features $f_{bounding}$ may be determined by dividing the bounding box of the object with the stroke U by the bounding box of the object without the stroke U (that is by taking $|B_{new}|/|B|$, where $|B|$ is the bounding box of the object and $|B_{new}|$ is the bounding box of the object including the stroke U). If the result is less than zero then the stroke U is considered part of the object.

FIG. 6 is an example flow diagram showing an illustrative process 600 for semantic-based sketch segmentation according to some implementations. For example, the process 600 is preformed as part of the step 412 of process 400 of FIG. 4. At 602, the segmenter receives line segments representative of a possible object.

At 604, the segmenter searches for images similar to the object using a sketch-based search engine and an image collection. The image collection is a set of images that have been tagged or identified as a particular object by a human. For example, the image collection may be a clipart database, as most clipart is hand-drawn, the contours of clipart images are similar to those of hand-drawn sketches and the clipart images are typically associated with user assigned text-based categories.

At 606, the segmenter receives a set of tagged images from the sketch-based search engine. The tagged images include some type of text-based identification, such that the segmenter is able to identify the object of the image. In some instances, the images may also include some type of associated text in addition to the tagging, such as a caption.

At 608, the segmenter calculates a word distribution of the object based on the images and the associated text returned by the sketch-based search engine. For example, assuming that in response to searching for an object there are N images $\{I_1, I_2, \ldots I_N\}$ returned by the sketch-based search engine and that W words are associated with the N images, such that $W=\{w_1, w_2, \ldots w_M\}$, where M is the number of unique words in the associated text of the N images. Thus, a word score may be calculated using the following formula:

$$Pr(w) = \frac{Score(w | Object)}{\sum_{w \in W} Score(w | Object)} \quad (6)$$

where Score(w|Object) may be expressed as:

$$Score(w | Object) = \sum_{n=1}^{N} \delta(w, I_N) * Sim(Object, I_N) \quad (7)$$

where $\delta(w, I_N)$ is 1 if a word $w_i$ appears in the description of the image $I_N$ and 0 otherwise. Sim(Object, $I_N$) is the similarity between the object and the image $I_N$, which is provided by the sketch-based search engine as part of the search result.

At 610, the segmenter determines an entropy value for the object based in part on the word scores calculated in 608. For example, the entropy value (H) may be expressed as follows:

$$H = \Sigma_{w \in W} - Pr(w) \log(Pr(w)) \quad (8)$$

Once the entropy value (H) of the object is determined it may be stored to identify objects once the entropy values of each of the possible objects are determined, to determine a change in the trend of the entropy values of the objects or compared to a threshold value to determine if the entropy value is low enough to represent an object. For example, two line segments $S_1$ and $S_2$ may be merged into an object if the entropy values of the line segments are greater than the entropy value of the merged object, that is if $H(S_1 \cup S_2) < \min\{H(S_1), H(S_2)\}$.

In one implementation, the semantic-based segmenter takes into account the difference of the word distributions when determining whether to merge two objects. For instance, the KL-divergence of the word distributions of two objects may be defined as:

$$D_{KL}(Object_1, Object_2) = \sum_{w \in W} Pr1(w) \log\left(\frac{Pr_1(w)}{Pr_2(w)}\right) \quad (9)$$

Thus, the KL-divergence is added to the merging criterion to ensure that a small line segment does not make the entropy value increase if the word distribution does not change more than a pre-determined amount. Thus, line segments $S_1$ and $S_2$ are merged together according to an entropy value calculated using the following formula:

$$H(S_1 \cup S_2) < \min\left\{H(S_1) + \frac{\beta}{D_{KL}(S_1, S_1 \cup S_2)}, H(S_2) + \frac{\beta}{D_{KL}(S_2, S_1 \cup S_2)}\right\}. \quad (10)$$

where $\beta$ is a constant, which may be set based on the length of the line segment which should be considered small.

Illustrative Examples

Figure 7:
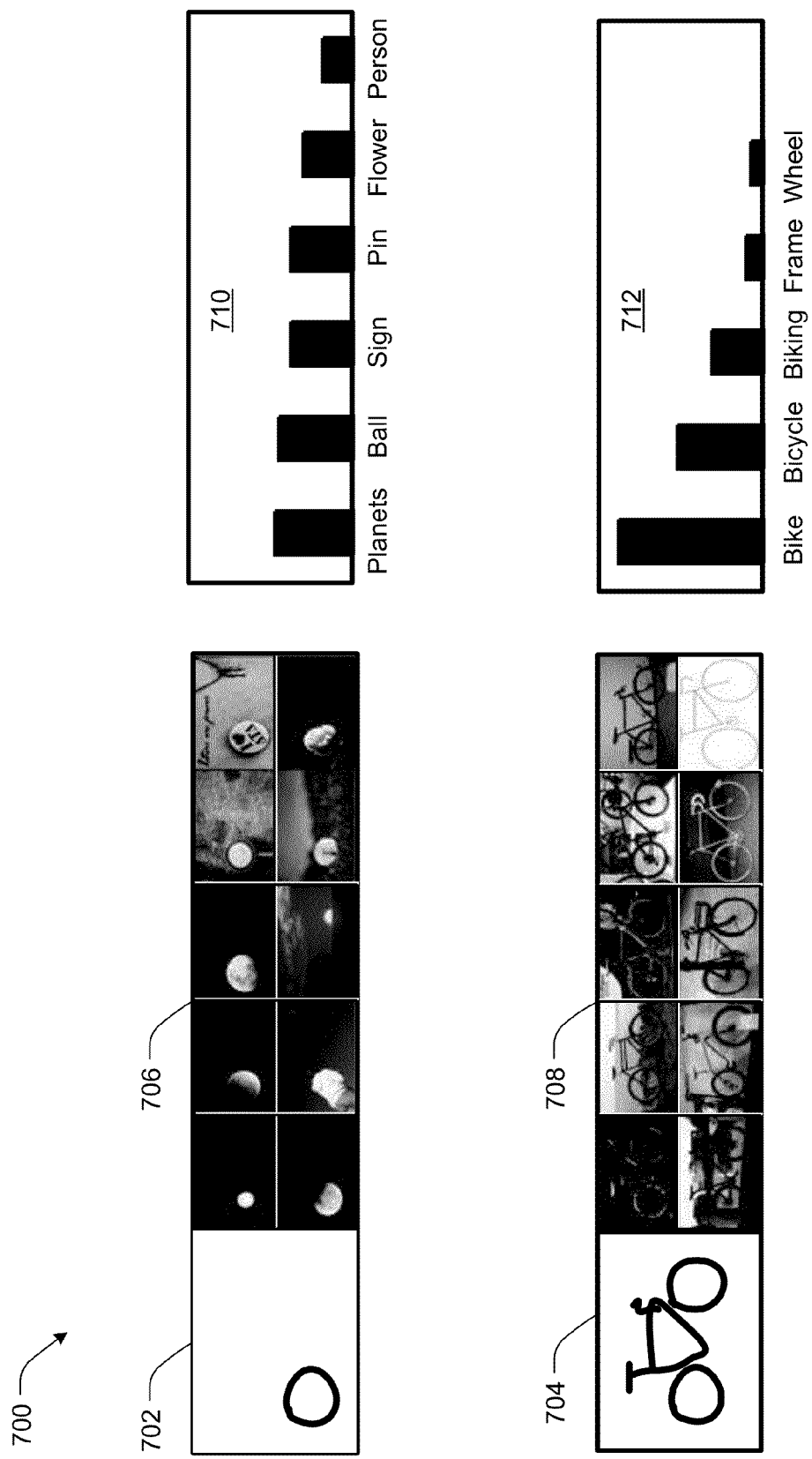
FIG. 7 is a graph illustrating search results returned as part of the semantic-based sketch segmentation process according to some implementations.

FIG. 7 is a graph 700 illustrating search results returned as part of the semantic-based sketch segmentation process according to some implementations. In the illustrated example, the semantic-based segmenter is attempting to identify a hand-drawn sketch of a bicycle. The illustrated example, shows the search results of the first possible object 702 (i.e. the rear wheel of the bicycle) and a second possible object 704 (i.e. the entire bicycle). It should be understood, that various other possible objects may have also been analyzed by the semantic-based segmenter, such as an object including both wheels, an object including the frame and one wheel, the frame and both wheels, etc.

The illustrated example, also shows a first set of images 706 returned as a result of submitting the first object 702 (the rear wheel) and a second set of images 708 returned as a result of submitting the second object 704 (the bicycle). Both the first set of images 706 and the second set of images 708 also include associated text. The associated text is parsed by the semantic-based segmenter to generate the first graph 710 and the second graph 712. The first graph 710 includes the words parsed from the text associated with the first set of images 706, ranked according to frequency of occurrence. The second graph 712 includes the words parsed from the text associated with the second set of images 708, again ranked according to frequency of occurrence.

The semantic-based segmenter generates a word score based on the number of words returned and the frequency that each word occurred. The word score and a similarity factor (or ranking of image results based on similarity by the sketch-based search engine) are utilized to determine the entropy values for the possible objects 702 and 704. For example, as illustrated, graph 710 includes six words with substantially even distribution between the words, while graph 712 includes five words distributed mostly in three categories: bike, bicycle and biking Thus, object 704 has a lower entropy value than object 702, as the number of words returned is less and the distribution of the words is more heavily weighted to a small subset of similar words.

Figure 8:
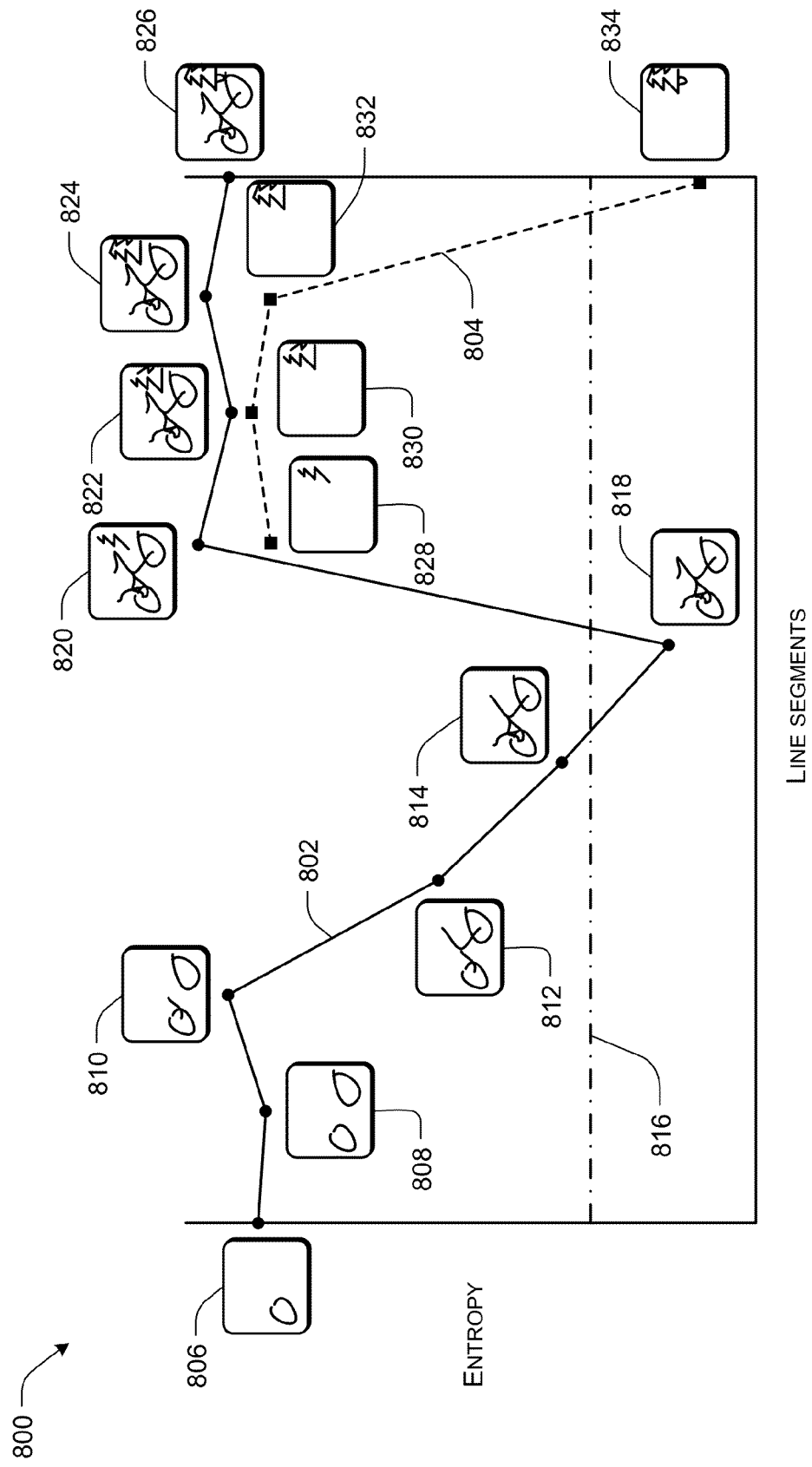
FIG. 8 is a graph illustrating entropy values of the semantic-based sketch segmentation process according to some implementations.

FIG. 8 is a graph 800 illustrating entropy values of the semantic-based sketch segmentation process according to some implementations. In the illustrated example, the semantic-based segmenter is segmenting a hand-drawn sketch including two objects, a bicycle and a pine tree. The entropy values of the bicycle and the pine tree are illustrated by lines 802 and 804, respectively.

As illustrated, the semantic-based segmenter beings by selecting the left most line segment (the rear wheel of the bicycle) as a first set of line segments 806. As illustrated, the line segments 806 result in a high entropy value near the top of the graph 800. Next, the semantic-based segmenter analyzes line segments 808 (both wheels) to determine the entropy value. Again, the entropy value is high. The semantic-based segmenter continues by analyzing line segments 810 (the wheels and the rear frame). Once again, the entropy value is high.

The semantic-based segmenter next analyzes line segments 812 (both wheels and the full frame) to determine an entropy value. At this point, the entropy value beings to fall as the line segments 812 beings to resemble a distinct object (i.e. the bicycle). Next, the semantic-based segmenter analyzes line segments 814 (which includes the seat of the bicycle) to determine the entropy value. At this point, the entropy value is quite low but still above the threshold 816, so the line segments 814 are still not considered an object.

The semantic-based segmenter continues by analyzing line segments 818 (which includes the handle bars and is the complete bicycle). At this point, the resulting entropy value is below the threshold 816 and, in one implementation, the line segments 818 are identified as an object. However, in other implementation, the entropy values of all possible combinations of line segments are analyzed before an object is identified.

Thus, the semantic-based segmenter continues to determine entropy values. The semantic-based segmenter analyzes line segments 820 (which include some of the line segments associated with the second object, the pine tree). As expected, by adding the line segments associated with the pine tree the entropy value of line segments 820 is greater than the entropy value of line segments 818. As illustrated, the entropy value of line segments 820 is the highest of graph 800. The semantic-based segmenter proceeds to calculate entropy values for line segments 822, 824 and 826, as the remainder of the pine tree is considered. As the line segments 822, 824 and 826 represent two objects (the bicycle and the pine tree) the entropy values remain high. In some implementations, the line segments 818 are now selected as an object as line segments 818 produced the lowest entropy value of all possible objects.

The semantic-based segmenter also identifies the second object, the pine tree, from the sketch. Thus, the semantic-based segmenter selects the left most line segment that is not part of an object and beings, again, to calculate entropy values. For example, the semantic-based segmenter may select line segments 828 (the left side of the pine tree) and calculate the entropy value. As illustrated, the entropy value for line segments 828 is high, as the images returned by the sketch-based search engine are diverse.

The semantic-based segmenter continues to calculate entropy values for line segments 830 (the tree including the bottom), line segments 832 (the tree without a trunk) and line segments 834 (the entire tree). Again, the entropy values remain high until the line segments 834 representative of the full tree object is analyzed. The entropy value of the line segments 834 are below the threshold 816 and the lowest value of the pine tree. Thus, line segments 834 may be selected by the semantic-based segmenter as the second object.

Illustrative System

Figure 9:
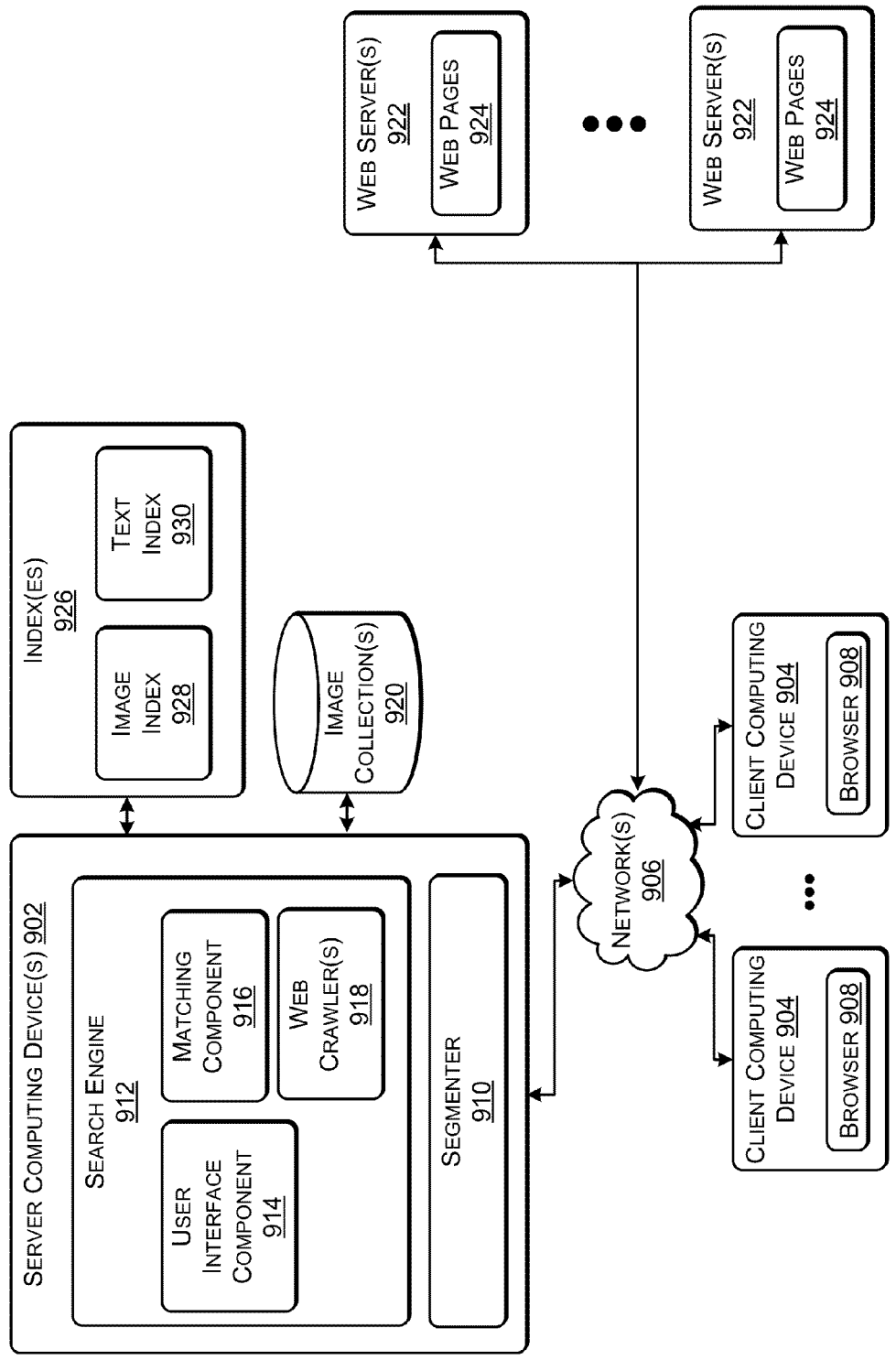
FIG. 9 is a block diagram illustrating an example system for carrying out sketch-based image segmentation according to some implementations herein.

FIG. 9 is a block diagram illustrating an example system 900 for carrying out sketch-based image segmentation according to some implementations. To this end, the system 900 includes one or more server computing device(s) 902 in communication with a plurality of client or user computing devices 904 through a network 906 or other communication link. In some implementations, server computing device 902 exists as a part of a data center, server farm, or the like, and is able to serve as a component for providing a commercial search website. The system 900 can include any number of the server computing devices 902 in communication with any number of client computing devices 904. For example, in one implementation, network 906 includes the World Wide Web implemented on the Internet, including numerous databases, servers, personal computers (PCs), workstations, terminals, mobile devices and other computing devices spread throughout the world and able to communicate with one another. Alternatively, in another possible implementation, the network 906 can include just a single server computing device 902 in communication with one or more client devices 904 via a LAN (local area network) or a WAN (wide area network). Thus, the client computing devices 904 can be coupled to the server computing device 902 in various combinations through a wired and/or wireless network 906, including a LAN, WAN, or any other networking technology, using one or more protocols, for example, a transmission control protocol running over Internet protocol (TCP/IP), or other suitable protocols.

In some implementations, client computing devices 904 are personal computers, workstations, terminals, mobile computing devices, PDAs (personal digital assistants), cell phones, smartphones, laptops, tablet computing devices, or other computing devices having data processing capability. Furthermore, client computing devices 904 may include a browser 908 for communicating with server computing device 902, such as for presenting a user interface of the sketching model to a user and for submitting a sketch to the server computing device 902. Browser 908 may be any suitable type of web browser such as Internet Explorer®, Firefox®, Chrome®, Safari®, or other type of software configured to enable submission of a sketch for segmentation as disclosed herein.

In addition, server computing device 902 may include a segmenter 910 (such as segmenter 104 of FIG. 1) and an image-based search engine 912 for performing an image search using the sketch received from client computing devices 904 as a query. Accordingly, in some implementations, search engine 914 may include user interface component 916 and matching component 918, for performing the image-based search on one or more image collections 920, as described herein. In some implementations, user interface component 914 may provide the user interface to the user as a webpage able to be viewed and interacted with by the client computing devices 904 through browsers 908.

Additionally, the search engine 912 may include one or more web crawlers 918 for searching one or more web servers 922 to locate, tag and/or index images from one or more web pages 924. The web crawlers 918 may generate one or more indexes 926 having an image index 928 and a text index 930. In some implementations, the indexes 926 may be utilized to locate images within the image collections 920 and/or online at one or more web servers 822. Thus, in some examples, the search engine 912 may locate images from multiple websites on the Internet, while, in other examples, the search engine 912 may located the images from the image collection 920 stored in a database accessible by server computing device 902. The web crawlers 918 generate one or more indexes 926 for the images, such as the image index 928 for sketch-based search of images and the text index 930 for text-based search of the images.

The segmenter 910 segment the sketch received from the client computing device 904 into multiple objects. The segmenter 910 may perform proximity-based segmentation, intuition-based segmentation, knowledge-based segmentation and/or a combination of the above. In some example, the segmenter 910 utilizes search engine 912, indexes 926 and/or image collections 920 to segment the sketch into multiple objects.

The objects or segmentation results may be used to perform a natural image search of images available on web pages 824, thus increasing the effectiveness of the search over sketch-based search or text-based search alone. For example, the sketch query may be applied to perform a search using the image index 828, and the segmentation results may be used to filter the results for improving the accuracy of the search results for locating the most relevant images. Alternatively, the recognized objects of the query may be used to obtain image results using an image-based search, and the sketch query may be used as a filter to locate the most relevant images from the image-based search results.

Furthermore, while an example system architecture is illustrated in FIG. 9, other suitable architectures may also be used, and that implementations herein are not limited to any particular architecture. For example, in some implementations, indexes 928 may be located at server computing device 902. Other variations will also be apparent to those of skill in the art in light of the disclosure herein.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A system comprising:
   one or more input interfaces for receiving a sketch including at least one object;
   one or more processors; and
   a computer-readable storage media storing instructions, which when executed by the one or more processors, cause the one or more processors to segment the sketch into objects by:
      selecting a line segment from a plurality of line segments as a first line segment of a cluster of line segments;
      selecting a second line segment from the plurality of line segments and merging the second line segment with the cluster of line segments when the second line segment is less than a threshold distance from the line segments of the cluster;
      comparing unmerged line segments according to rules and merging the unmerged line segments with the cluster of line segments when the unmerged line segments satisfy at least one of the rules;
      searching for images similar to the cluster of line segments from a collection of identified images;
      calculating an entropy value for the cluster of line segments based at least in part on identified images; and
      classifying the cluster of line segments as an object of the sketch based at least in part on the entropy value and the identified images.

2. The system of claim 1, wherein the identified images include associated text and the entropy value is based at least in part on a word score determined from the associated text.

3. The system of claim 1, wherein images within the collection of images are retrieved by a web-crawler.

4. The system of claim 1, wherein the collection of images is accessed via one or more communication interfaces.

5. The system of claim 1, wherein the rules comprise at least one of:
   analyzing similarity between strokes of the line segments of the cluster of line segments and strokes of the unmerged line segments;
   comparing a direction of the line segments of the cluster and a direction of the unmerged line segments;
   comparing a symmetry value of the cluster of line segments without the unmerged line segments to a symmetry value of the cluster of line segments including at least one of the unmerged line segments;
   determining if the cluster of line segments encloses at least one of the unmerged line segments;
   determining if merging at least one of the unmerged line segments increases closure of the cluster of line segments;
   comparing a compactness value of the cluster of line segments without the unmerged line segments to a compactness value of the cluster of line segments including at least one of the unmerged line segments;
   comparing a length of the line segments of the cluster and a length of the unmerged line segments;
   comparing a convex hull value of the cluster of line segments without the unmerged line segments to a convex hull value of the cluster of line segments including at least one of the unmerged line segments; and
   comparing the unmerged line segments based a bounding box formed around the cluster of line segments.

6. The system of claim 1, further comprising one or more output interfaces for providing the object to a user.

7. A method comprising:
   receiving a sketch including a plurality of line segments;
   generating combinations of line segments from the plurality of line segments and for at least one of the combinations of line segments:
   querying a collection of images using the combination of line segments as an input and receiving a set of images in response, at least one image of the set of images including associated text identifying objects in the images;
   calculating an entropy value for the combination of line segments based at least in part the set of images and the associated text; and
   determining if the combination of line segments is an object based on the entropy value.

8. The method of claim 7, further comprising:
   calculating a word score based at least in part on the associated text; and
   wherein the entropy value is based at least in part on the word score.

9. The method of claim 7, wherein the set of images are clipart images.

10. The method of claim 7, wherein the combination of line segments is the object if the entropy value is less than a threshold.

11. The method of claim 7, wherein the combination of line segments is the object if the combination of line segments has a lowest entropy value out of at least one of the combination of line segments.

12. The method of claim 7, wherein the calculating the entropy value for the combination of line segments includes adjusting the entropy value based on a length of at least one of the line segments.

13. The method of claim 7, wherein the querying the collection of images includes submitting the combination of line segments to a sketch-based search engine.

14. The method of claim 7, wherein the combination of line segments is generated by merging line segments within a threshold distance of the cluster into the combination of line segments.

15. The method of claim 7, wherein the combination of line segments is generated by selecting line segments according to at least one of similarity in stroke, continuity of direction, symmetry, closure, compactness, similarity in lengths or bounding boxes.

16. A computer-readable storage media storing instructions that, when executed by one or more processors, cause the one or more processors to perform operations comprising:
receiving one or more line segments corresponding to a sketch;
segmenting at least a portion of the sketch into an object by merging the one or more line segments of the sketch into the object based at least in part on comparing the line segments of the object and a line segment to be merged;
calculating an entropy value for the one or more merged line segments based at least in part on identified images; and
classifying the one or more merged line segments as an object of the sketch based at least in part on the entropy value and the identified images.

17. The computer-readable storage media of claim 16, wherein the comparing further comprises:
selecting a plurality of sub-strokes from the line segments of the object and the line segment to be merged;
determining an orientation of at least one of the sub-strokes;
calculating a feature vector based on the orientations; and
determining a similarity feature value based on the feature vectors.

18. The computer-readable storage media of claim 16, wherein the comparing further comprises:
selecting a first point on the object that is closest to the line segment to be merged;
selecting a second point on the line segment to be merged;
determining an orientation at the first point and the second point; and
comparing the orientations.

19. The computer-readable storage media of claim 16, wherein the comparing is based on at least one of comparing:
a similarity in strokes of the line segments of the object and the line segment to be merged;
a continuity of directions between the line segments of the object and the line segment to be merged;
symmetry of the object including the line segments of the object and the line segment to be merged;
closure of the object including the line segments of the object and the line segment to be merged;
compactness of the object including the line segments of the object and the line segment to be merged; or
similarity in lengths of the line segments of the object and the line segment to be merged.

* * * * *